US012671638B2

(12) United States Patent
Uzawa et al.

(10) Patent No.: US 12,671,638 B2
(45) Date of Patent: Jun. 30, 2026

(54) PACKET CAPTURE DEVICE AND METHOD

(71) Applicant: NTT, Inc., Tokyo (JP)

(72) Inventors: Hiroyuki Uzawa, Tokyo (JP); Saki Hatta, Tokyo (JP); Shuhei Yoshida, Tokyo (JP); Yusuke Sekihara, Tokyo (JP); Shoko Oteru, Tokyo (JP); Namiko Ikeda, Tokyo (JP)

(73) Assignee: NTT, INC., Tokyo (JP)

( * ) Notice: Subject to any disclaimer, the term of this patent is extended or adjusted under 35 U.S.C. 154(b) by 201 days.

(21) Appl. No.: 18/683,713

(22) PCT Filed: Sep. 14, 2021

(86) PCT No.: PCT/JP2021/033670
§ 371 (c)(1),
(2) Date: Feb. 14, 2024

(87) PCT Pub. No.: WO2023/042245
PCT Pub. Date: Mar. 23, 2023

(65) Prior Publication Data
US 2024/0356825 A1 Oct. 24, 2024

(51) Int. Cl.
H04L 43/026 (2022.01)
H04L 43/04 (2022.01)

(52) U.S. Cl.
CPC ............ H04L 43/026 (2013.01); H04L 43/04 (2013.01)

(58) Field of Classification Search
CPC ..... H04L 43/026; H04L 43/04; H04L 43/028; H04L 43/18
See application file for complete search history.

(56) References Cited

U.S. PATENT DOCUMENTS

| | | | | |
|---|---|---|---|---|
| 7,212,490 B1 * | 5/2007 | Kao | ...................... | H04L 45/121 370/406 |
| 10,528,730 B2 * | 1/2020 | Yamane | .................. | G06F 11/34 |
| 11,190,488 B1 * | 11/2021 | Marino | .................. | H04L 63/20 |
| 11,522,773 B1 * | 12/2022 | Tedesco | .................. | H04L 63/14 |
| 2005/0055399 A1 * | 3/2005 | Savchuk | ............. | H04L 63/1416 709/230 |
| 2009/0013407 A1 * | 1/2009 | Doctor | .................... | H04L 63/02 726/23 |
| 2010/0046393 A1 * | 2/2010 | Knapp | ................ | H04L 63/1425 370/253 |
| 2011/0026521 A1 * | 2/2011 | Gamage | ............. | H04L 45/3065 370/389 |

(Continued)

FOREIGN PATENT DOCUMENTS

JP        4955722 B2        6/2012

*Primary Examiner* — Javier O Guzman
(74) *Attorney, Agent, or Firm* — Slater Matsil, LLP

(57) ABSTRACT

A packet capturing device includes: a normal capturing function unit that accumulates packets that match conditions of a target flow registered in a flow table in response to an instruction to start capturing from outside and converts the accumulated packets into a captured file, from among packets flowing through a network that is a monitoring target; and a short-term capturing function unit that accumulates the packets received from the network during a period needed by the conditions of the target flow to be registered in the flow table from arrival of the instruction to start capturing and converts the accumulated packets into a captured file.

20 Claims, 14 Drawing Sheets

(56)                    References Cited

U.S. PATENT DOCUMENTS

| | | | | |
|---|---|---|---|---|
| 2013/0275576 A1* | 10/2013 | Hinz | ...................... | H04L 43/04 |
| | | | | 709/224 |
| 2013/0343378 A1* | 12/2013 | Veteikis | ................. | H04L 63/20 |
| | | | | 370/389 |
| 2014/0112187 A1* | 4/2014 | Kang | ................... | H04L 43/024 |
| | | | | 370/253 |
| 2014/0254787 A1* | 9/2014 | Slovacek | ......... | H04M 3/42221 |
| | | | | 379/265.06 |
| 2017/0116495 A1* | 4/2017 | Nomura | .............. | G06V 10/955 |
| 2017/0237640 A1* | 8/2017 | Stocker | ................ | G06F 16/955 |
| | | | | 709/224 |
| 2017/0299633 A1* | 10/2017 | Pietrowicz | ............. | H04L 43/12 |
| 2018/0302328 A1* | 10/2018 | Keith | ..................... | H04L 47/24 |
| 2021/0385138 A1* | 12/2021 | Watson | ................ | H04L 9/0891 |
| 2022/0278909 A1* | 9/2022 | Watson | ................ | H04L 9/0891 |

* cited by examiner

PACKET CAPTURE DEVICE AND METHOD

CROSS-REFERENCE TO RELATED APPLICATIONS

This application is a national phase entry of PCT Application No. PCT/JP2021/033670, filed on Sep. 14, 2021, which application is hereby incorporated herein by reference.

TECHNICAL FIELD

The present invention relates to a packet capturing device and a method for capturing packets flowing through a network that is a monitoring target.

BACKGROUND

With the progress of virtualization technologies in network functions virtualization (NFV)/software defined networking (SDN), various services using virtual machines (VMs) and the like have been provided. Packet capturing devices can selectively capture packets of specific flows, for example, groups of packets with the same rules that are combinations of transmission source Media Access Control (MAC) addresses, destination MAC addresses, Internet protocol (IP) addresses, and the like. Such packet capturing devices are a type of apparatuses that are essential in analysis of quality and analysis of failures at the time of providing the above services.

Figure 14:
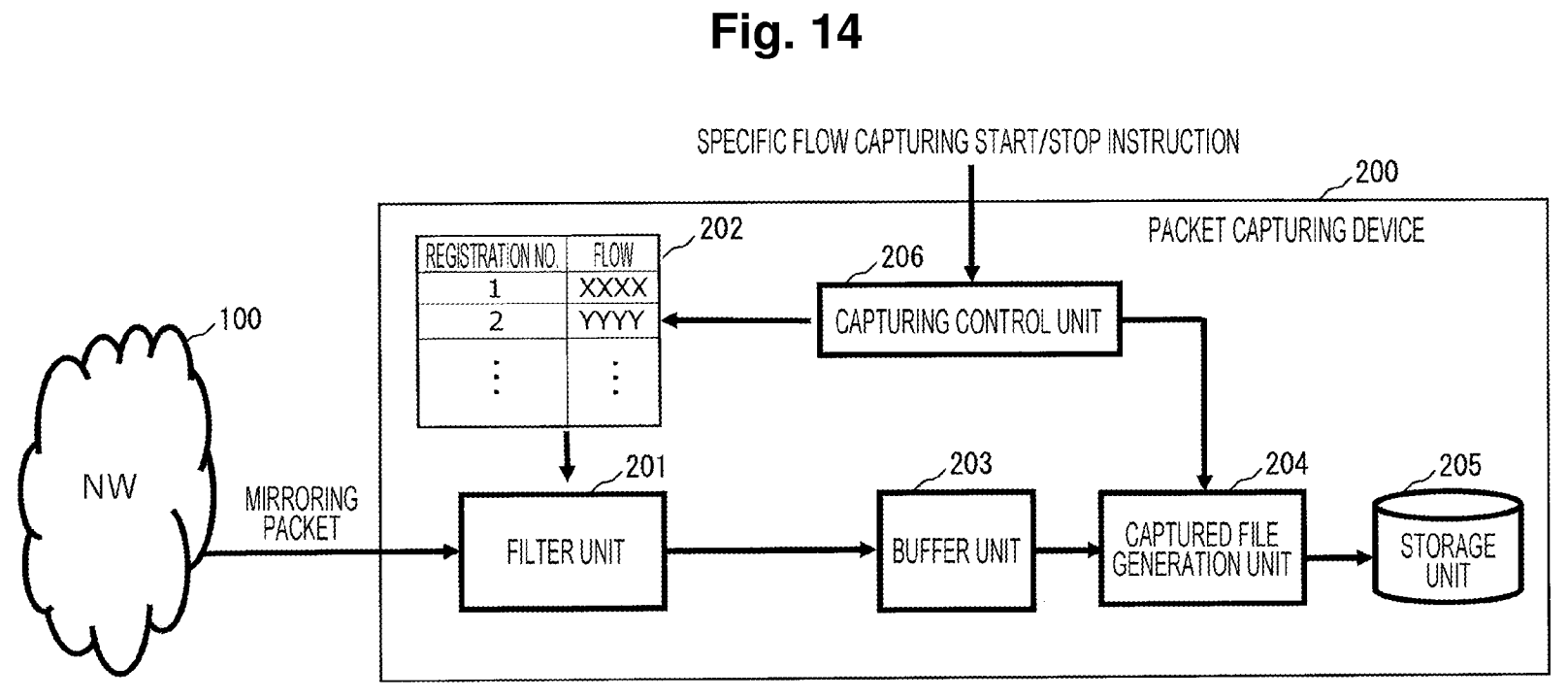

FIG. 14 illustrates a configuration of a packet capturing device disclosed in Patent Literature 1. A packet capturing device 200 receives a mirroring packet from a network (NW) 100 that is a monitoring target. A filter unit 201 picks up capturing targets. Picking-up performed by the filter unit 201 is processing of picking up, as capturing targets, packets that match a designated flow.

For the purpose of picking up packets, the filter unit 201 includes a flow table 202 in which conditions of a designated capture target flow are registered. Once packets are input, the filter unit 201 performs matching between the conditions of the capturing target flow recorded in the flow table 202 and the packets, and allows packets that match the conditions to pass therethrough, or discards packets that do not match the conditions.

A buffer unit 203 accumulates the packets that have passed through the filter unit 201. Once packet data accumulated in the buffer unit 203 reaches a predetermined data amount, or a predetermined time elapses, a captured file generation unit 204 converts the packet data into a captured file in a packet capture (pcap) format. The captured file is saved in a storage unit 205.

The capturing control unit 206 adds to the flow table 202 or deletes from the flow table 202, the conditions of the target flow on the basis of designation of the capturing target flow from outside.

In a packet capturing for the purpose of analyzing failures in a specific flow, it is necessary to capture packets immediately after detection of a failure. However, in the packet capturing device 200 in the related art, capturing of packets is not started until notification reception processing and target flow condition registration processing based on a notification of an instruction to start capturing are completed even if the notification is provided from the outside by being triggered by occurrence of a failure. Therefore, there is a problem that a time lag occurs before the capturing of packets is started, it is not possible to capture packets immediately after occurrence of a failure, and it is thus difficult to analyze the failure.

CITATION LIST

Patent Literature

Patent Literature 1: Japanese Patent No. 4955722

SUMMARY

Technical Problem

Embodiments of the present invention were made in order to solve the above problem, and an object thereof is to provide a packet capturing device and a method capable of capturing packets flowing thereinto without any omission during a time lag of the capturing function in the related art when an instruction to start capturing is provided from outside.

Solution to Problem

A packet capturing device according to embodiments of the present invention includes: a first capturing function unit configured to accumulate packets that match conditions of a target flow registered in a first flow table in response to an instruction to start capturing from outside from among packets flowing through a network that is a monitoring target and convert the accumulated packets into a captured file; and a second capturing function unit configured to accumulate packets received from the network during a period that is needed by the conditions of the target flow to be registered in the first flow table after arrival of the instruction to start capturing and convert the packets into a captured file.

Also, in the packet capturing device according to the first configuration example of the present invention, the first capturing function unit includes the first flow table configured to store the conditions of the target flow, a first filter unit configured to allow only packets that match the conditions registered in the first flow table to pass therethrough from among the packets received from the network, a first buffer unit configured to accumulate the packets that have passed through the first filter unit, a first captured file generation unit configured to convert the packets accumulated in the first buffer unit into a captured file, and a capturing control unit configured to register the conditions of the target flow designated by the instruction to start capturing in the first flow table, the second capturing function unit includes a second buffer unit with a ring buffer structure configured to accumulate the packets received from the network, and a second captured file generation unit configured to convert the packets accumulated in the second buffer unit into a captured file, the capturing control unit provides an instruction to stop accumulation of packets to the second buffer unit when registration in the first flow table is completed, and the second captured file generation unit provides an instruction to restart accumulation of packets to the second buffer unit when an output of the captured file generated from the packets accumulated in the second buffer unit is completed.

Additionally, in the packet capturing device according to the first configuration example of the present invention, the second capturing function unit selectively converts only packets that match the conditions of the target flow into the captured file from among the accumulated packets.

Additionally, in the packet capturing device according to the first configuration example of the present invention, the first capturing function unit includes the first flow table configured to store the conditions of the target flow, a first filter unit configured to allow only packets that match the conditions registered in the first flow table to pass therethrough from among the packets received from the network, a first buffer unit configured to accumulate the packets that have passed through the first filter unit, a first captured file generation unit configured to convert the packets accumulated in the first buffer unit into a captured file, and a capturing control unit configured to register the conditions of the target flow designated by the instruction to start capturing in the first flow table and a second flow table of the second capturing function unit, the second capturing function unit includes the second flow table configured to store the condition of the target flow, a second buffer unit with a ring buffer structure configured to accumulate the packets received from the network, and a second captured file generation unit configured to selectively convert only packets that match the conditions registered in the second flow table into a captured file from among the packets accumulated in the second buffer unit.

Additionally, in the packet capturing device according to the first configuration example of the present invention, the first capturing function unit performs matching between the conditions registered in the first flow table and the packets every time the packets are received from the network and outputs a matching result to the second capturing function unit, and the second capturing function unit accumulates only packets from which the matching result that the packets do not match the conditions registered in the first flow table has been obtained and converts the packets into a captured file, from among packets received from the network during a period needed by the conditions of the target flow to be registered in the first flow table after arrival of the instruction to start capturing.

Additionally, in the packet capturing device according to the first configuration example of the present invention, the first capturing function unit includes the first flow table configured to store the conditions of the target flow; a first filter unit configured to allow only packets that match the conditions registered in the first flow table to pass therethrough from among the packets received from the network and output the matching result to the second capturing function unit, a first buffer unit configured to accumulate the packets that have passed through the first filter unit, a first captured file generation unit configured to convert the packets accumulated in the first buffer unit into a captured file, and a capturing control unit configured to register the conditions of the target flow designated by the instruction to start capturing in the first flow table, and the second capturing function unit includes a second filter unit configured to allow only packets from which the matching result that the packets do not match the conditions registered in the first flow table has been obtained to pass therethrough from among the packets received from the network, a second buffer unit with a ring buffer structure configured to accumulate the packets that have passed through the second filter unit, and a second captured file generation unit configured to convert the packets accumulated in the second buffer unit into a captured file.

Moreover, the packet capturing device according to the first configuration example of the present invention further includes: a storage unit that is for storing the captured file output from each of the first capturing function unit and the second capturing function unit; and an arbitrating unit configured to perform control to place priority on writing of the captured file generated by the first capturing function unit when the captured file is written in the storage unit.

Also, a packet capturing method according to embodiments of the present invention includes: a first step of accumulating, in a first buffer unit, packets that match conditions of a target flow registered in a flow table in response to an instruction to start capturing from outside from among packets flowing through a network that is a monitoring target; a second step of converting the packets accumulated in the first buffer unit into a captured file; a third step of accumulating, in a second buffer unit, packets received from the network during a period needed by the conditions of the target flow to be registered in the flow table after arrival of the instruction to start capturing; and a fourth step of converting the packets accumulated in the second buffer unit into a captured file.

Advantageous Effects of Embodiments of Invention

According to embodiments of the present invention, the second capturing function unit that accumulates packets received from the network during the period needed by the conditions of the target flow to be registered in the first flow table after the arrival of the instruction to start capturing and converts the accumulated packets into a captured file is further provided in addition to the first capturing function unit. Since the packets are accumulated in the second capturing function unit in advance before the instruction to start capturing by providing the second capturing function unit in embodiments of the present invention, it is possible to capture the packets flowing thereinto during a time lag of the first capturing function unit without any omission when the instruction to start capturing is provided from the outside by being triggered by detection or the like of occurrence of a failure in the network, for example.

BRIEF DESCRIPTION OF THE DRAWINGS

FIG. 1 is a block diagram illustrating a configuration of a packet capturing device according to a first embodiment of the present invention.

FIG. 14 is a block diagram illustrating a configuration of a packet capturing device in the related art.

DETAILED DESCRIPTION OF ILLUSTRATIVE EMBODIMENTS

First Embodiment

Figure 1:
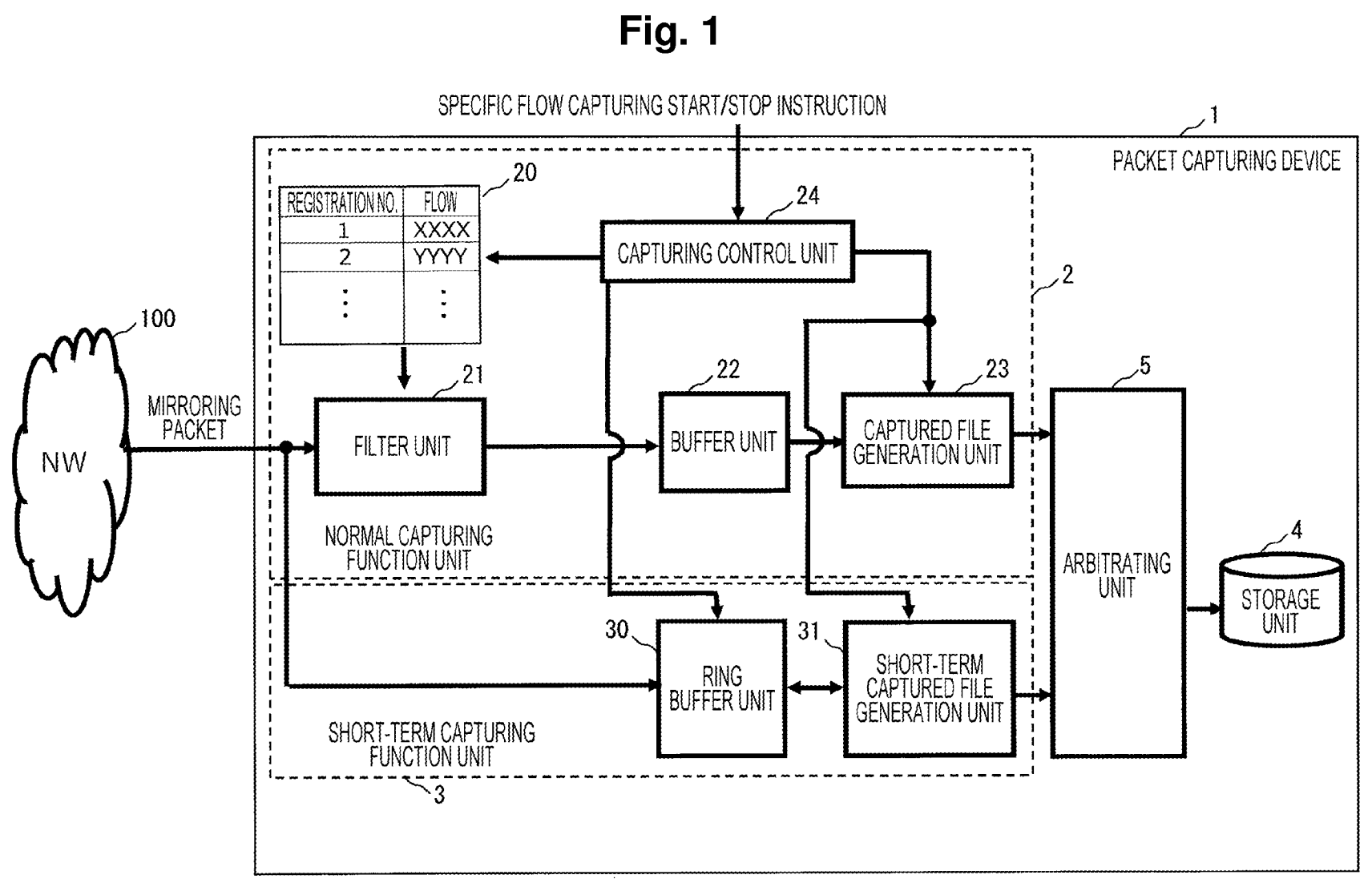
Figure 2:
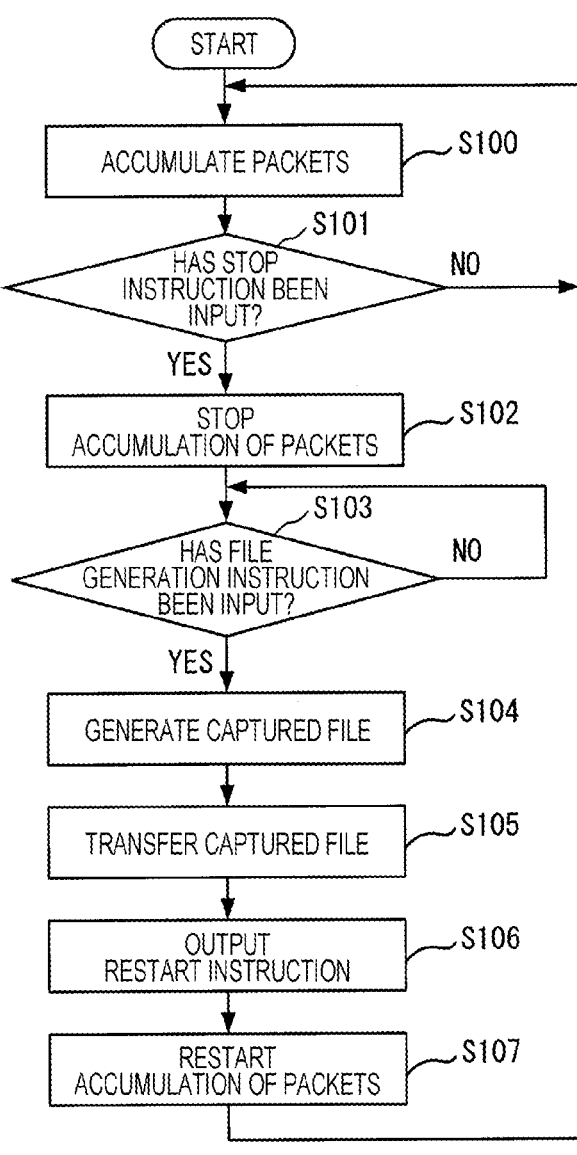
FIG. 2 is a flowchart for explaining operations of a short-term capturing function unit according to the first embodiment of the present invention.

Hereinafter, embodiments of the present invention will be described with reference to the drawings. FIG. 1 is a block diagram illustrating a configuration of a packet capturing device according to a first embodiment of the present invention.

A packet capturing device 1 according to the embodiment is different from that in the related art in that a short-term capturing function unit 3 (second capturing function unit) for capturing packets input during a time lag period until a normal capturing function unit 2 starts capturing is newly included in addition to the normal capturing function unit 2 (first capturing function unit) for capturing packets that match conditions of a specific flow on the basis of an instruction to start capturing from the outside.

Furthermore, the packet capturing device 1 includes a storage unit 4 for storing a captured file output from each of the normal capturing function unit 2 and the short-term capturing function unit 3 and an arbitrating unit 5 that performs control to place priority on writing of the captured file generated by the normal capturing function unit 2 when the capturing files are written in the storage unit 4.

The normal capturing function unit 2 includes a flow table 20 that stores conditions of a capturing target flow, a filter unit 21 (first filter unit) that allows only packets that match the conditions recorded in the flow table 20 to pass therethrough from among packets received from a network 100 that is a monitoring target, a buffer unit 22 (first buffer unit) that accumulates the packets that have passed through the filter unit 21, a captured file generation unit 23 (first captured file generation unit) that converts the packets accumulated in the buffer unit 22 into a captured file, and a capturing control unit 24 that registers, in the flow table 20, the conditions of the capturing target flow designated by an instruction to start capturing from outside.

The short-term capturing function unit 3 includes a ring buffer unit 30 (second buffer unit) that accumulates packets received from the network 100 and a short-term captured file generation unit 31 (second captured file generation unit) that converts the packets accumulated in the ring buffer unit 30 into a captured file.

Figure 3:
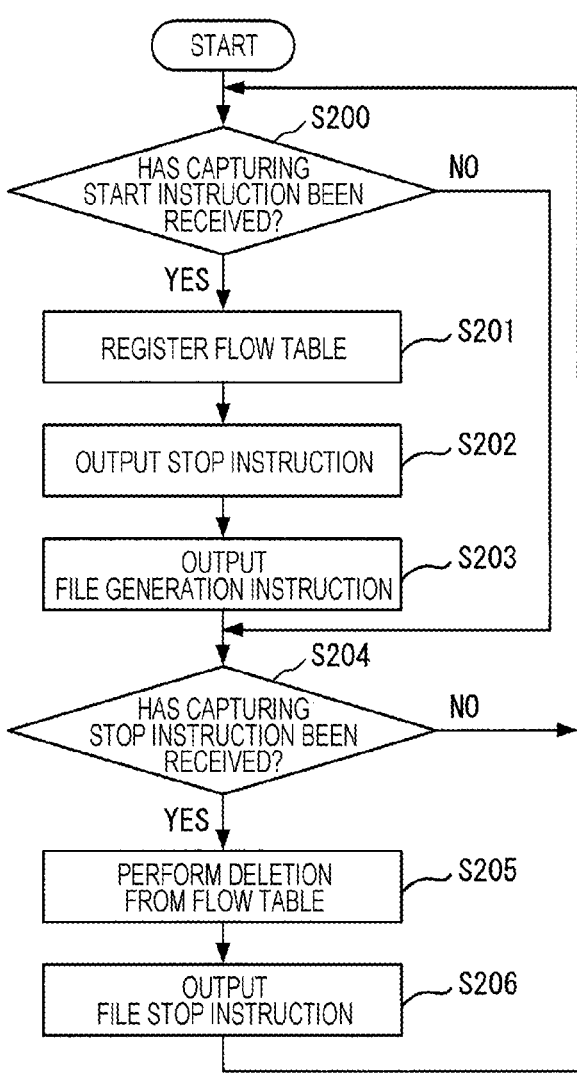
FIG. 3 is a flowchart for explaining operations of a capturing control unit of a normal capturing function unit according to the first embodiment of the present invention.
Figure 4:
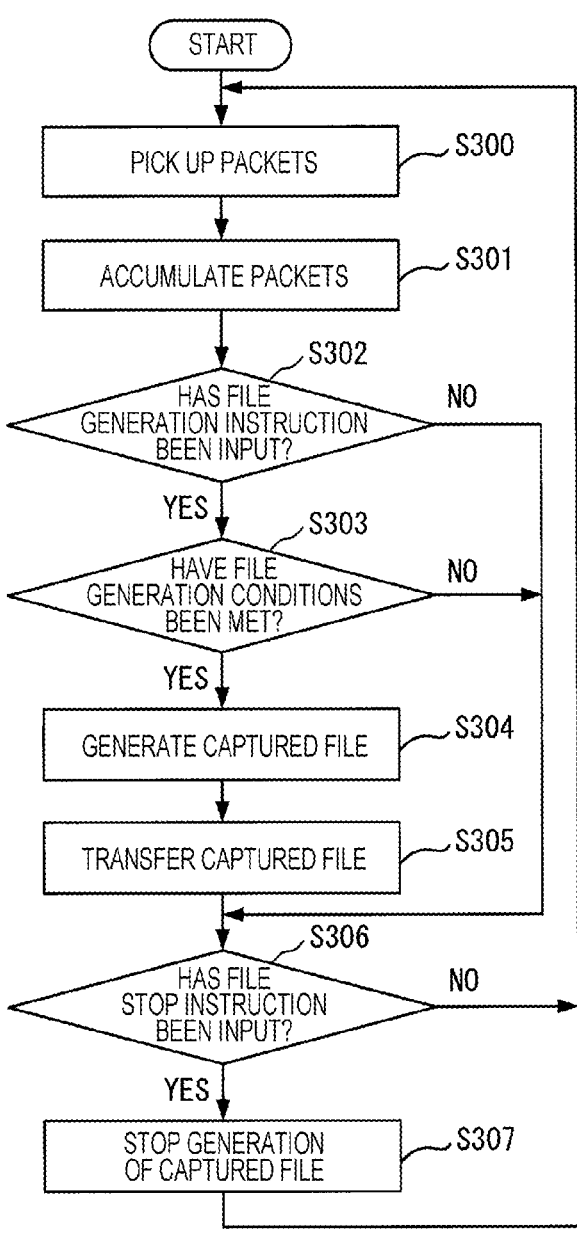
FIG. 4 is a flowchart for explaining operations of a filter unit, a buffer unit, and a captured file generation unit of the normal capturing function unit according to the first embodiment of the present invention.

FIG. 2 is a flowchart for explaining operations of the short-term capturing function unit 3, FIG. 3 is a flowchart for explaining operations of the capturing control unit 24 of the normal capturing function unit 2, and FIG. 4 is a flowchart for explaining operations of the filter unit 21, the buffer unit 22, and the captured file generation unit 23 of the normal capturing function unit 2.

The short-term capturing function unit 3 cannot know a capturing target flow provided as a notification from outside in advance. Therefore, the short-term capturing function unit 3 captures packets in the entire flow until an instruction to stop accumulation is received from the capturing control unit 24 of the normal capturing function unit 2.

Specifically, the short-term capturing function unit 3 has a ring buffer unit 30. The ring buffer unit 30 accumulates mirroring packets that copy packets flowing through the network 100 (Step S100 in FIG. 2).

The mirroring packets are generated by a mirroring function of a device on the network 100. When the ring buffer unit 30 becomes full, the oldest accumulated packet is overwritten by the latest packet. Accumulation of packets by such a ring buffer unit 30 is continuously performed.

Note that in the present embodiment, the packets input during the time lag period before the normal capturing function unit 2 starts capturing are captured by the short-term capturing function unit 3. Therefore, it is necessary for the ring buffer unit 30 to have a capacity capable of accumulating packets corresponding to a time that is longer than the time lag of the normal capturing function unit 2.

On the other hand, once an instruction to start capturing of a specific flow is received from the outside (YES in Step S200 in FIG. 3), the capturing control unit 24 of the normal capturing function unit 2 registers conditions of the capturing target flow in the flow table 20 (Step S201 in FIG. 3). The conditions of the capturing target flow include information such as a transmission source MAC address, a destination MAC address, and an IP address, for example. These conditions of the target flow are added to the instruction to start capturing received from the outside.

After the registration in the flow table 20 is completed, the capturing control unit 24 outputs a stop instruction signal to the ring buffer unit 30 of the short-term capturing function unit 3 (Step S202 in FIG. 3) and outputs file generation instruction signals to the short-term captured file generation unit 31 of the short-term capturing function unit 3 and the captured file generation unit 23 of the normal capturing function unit 2 (Step S203 in FIG. 3).

The ring buffer unit 30 of the short-term capturing function unit 3 stops accumulation of the packets (Step S102 in FIG. 2) in response to an input of the stop instruction signal from the capturing control unit 24 (YES in Step S101 in FIG. 2).

The short-term captured file generation unit 31 of the short-term capturing function unit 3 extracts the packets accumulated in the ring buffer unit 30 and converts them into a captured file in the pcap format (Step S104 in FIG. 2) in response to an input of the file generation instruction signal from the capturing control unit 24 (YES in Step S103 in FIG. 2).

The short-term captured file generation unit 31 transfers the generated captured file to the arbitrating unit 5 (Step S105 in FIG. 2). The short-term captured file generation unit 31 outputs a packet accumulation restart instruction signal to the ring buffer unit 30 after the transfer of the captured file is completed (Step S106 in FIG. 2).

The ring buffer unit 30 restarts the accumulation of packets in response to an input of the restart instruction signal from the short-term captured file generation unit 31 (Step S107 in FIG. 2).

On the other hand, the filter unit 21 of the normal capturing function unit 2 performs matching between the conditions of the capturing target flow registered in the flow table 20 and a packet every time a mirroring packet is received from the network 100, and allows packets that match the conditions to pass therethrough, or discards packets that do not match the conditions (Step S300 in FIG. 4).

The buffer unit 22 of the normal capturing function unit 2 accumulates the packets that have passed through the filter unit 21 (Step S301 in FIG. 4). Representative examples of the buffer unit 22 includes a First In, First Out (FIFO) buffer.

The captured file generation unit 23 of the normal capturing function unit 2 extracts the packets accumulated in the buffer unit 22 and converts them into a captured file in the pcap format (Step S304 in FIG. 4) when the file generation instruction signal is input form the capturing control unit 24 (YES in Step S302 in FIG. 4) and a file generation condition is satisfied (Step S303 in FIG. 4).

The file generation condition is either that the amounts of packets accumulated in the buffer unit 22 reaches a predetermined amount or that a predetermined time elapses. Which one of them is to be adopted as the file generation condition is set in advance.

In this manner, the captured file generation unit 23 generates a captured file every time the amount of packets accumulated in the buffer unit 22 reaches the predetermined amount or every time the predetermined time elapses.

The captured file generation unit 23 transfers the generated captured file to the arbitrating unit 5 (Step S305 in FIG. 4). Note that YES determination is always made in Step S302 until a file stop instruction signal, which will be described later, is input after the capturing control unit 24 inputs the file generation instruction signal.

Next, once an instruction to stop capturing of a specific flow is received from outside (YES in Step S204 in FIG. 3), the capturing control unit 24 of the normal capturing function unit 2 deletes, from the flow table 20, conditions of the capturing target flow for which capturing stop is designated (Step S205 in FIG. 3).

After the deletion from the flow table 20 is completed, the capturing control unit 24 outputs a file stop instruction signal to the captured file generation unit 23 of the normal capturing function unit 2 (Step S206 in FIG. 3).

Once the file stop instruction signal is input from the capturing control unit 24 (YES in Step S306 in FIG. 4), the captured file generation unit 23 of the normal capturing function unit 2 stops generation of the captured file (Step S307 in FIG. 4).

Next, operations of the arbitrating unit 5 will be described by using FIG. 5. The arbitrating unit 5 stores, in the storage unit 4, the captured file transferred from the normal capturing function unit 2 and the captured file transferred from the short-term capturing function unit 3. Here, in a case where there is a captured file transferred from the normal capturing function unit 2 (YES in Step S400 in FIG. 5), the arbitrating unit 5 places priority in storing the captured file transferred from the normal capturing function unit 2 in the storage unit 4 (Step S401 in FIG. 5).

Figure 5:
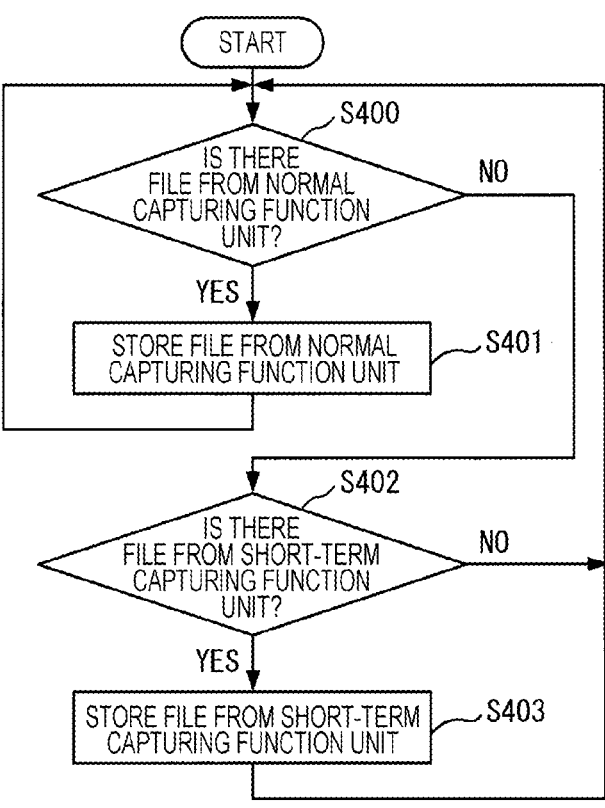
FIG. 5 is a flowchart for explaining operations of an arbitrating unit according to the first embodiment of the present invention.

Also, in a case where there is no captured file transferred from the normal capturing function unit 2 and there is a captured file transferred from the short-term capturing function unit 3 (YES in Step S402 in FIG. 5), the arbitrating unit 5 stores the captured file transferred from the short-term capturing function unit 3 in the storage unit 4 (Step S403 in FIG. 5).

Figure 6:
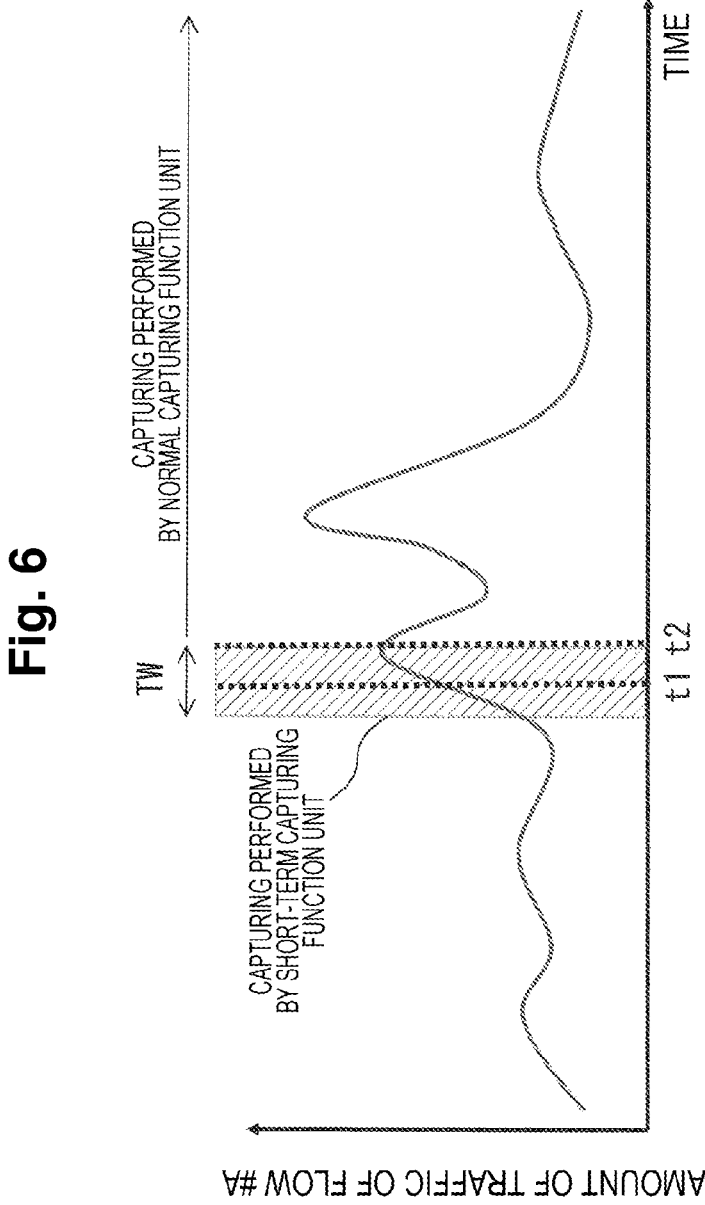
FIG. 6 is a diagram illustrating an operation example of the packet capturing device according to the first embodiment of the present invention.

FIG. 6 is a diagram illustrating an operation example of the packet capturing device 1 according to the present embodiment. Here, an example in which packets of a flow

A that matches the conditions of the target flow registered in the flow table 20 are captured by the packet capturing device 1 will be described.

As described above, the ring buffer unit 30 of the short-term capturing function unit 3 accumulates packets of the entire flow. The time width TW in FIG. 6 indicates a period during which the ring buffer unit 30 can accumulate packets and corresponds to the capacity of the ring buffer unit 30.

Once a specific flow capturing start instruction is input from the outside at a clock time t1, then the accumulation of packets performed by the ring buffer unit 30 is stopped at a clock time t2 after the time lag elapses. The time lag is a time needed by the conditions of the capturing target flow to be registered in the flow table 20 after the capturing start instruction arrives.

As described above, once the conditions of the capturing target flow are registered in the flow table 20, the capturing control unit 24 outputs the stop instruction signal to the ring buffer unit 30, and the file generation instruction signals are output to the short-term captured file generation unit 31 and the captured file generation unit 23.

Therefore, the accumulation of packets performed by the ring buffer unit 30 is stopped at the clock time t2, and after then, the normal capturing function unit 2 accumulates packets of the target flow and generates a captured file. The captured file generated by the normal capturing function unit 2 is continuously generated until an instruction to stop capturing is given from the outside.

On the other hand, the captured file transferred from the short-term capturing function unit 3 to the storage unit 4 is in an already generated state in a state where the normal capturing function unit 2 is accumulating packets of the target flow.

Thus, the arbitrating unit 5 places priority on the transfer of the captured file continuously generated by the normal capturing function unit 2 and stores the captured file transferred from the short-term capturing function unit 3 in the storage unit 4 in a time zone in which the normal capturing function unit 2 does not transfer the captured file.

As described above, since the short-term capturing function unit 3 accumulates packets in advance before the instruction to start capturing in the present embodiment, it is possible to capture packets flowing thereinto during a time lag of the normal capturing function unit 2 without any omission when an instruction to start capturing is provided from the outside by being triggered by detection or the like of occurrence of a failure in the network, for example.

Note that once the transfer of the captured file to the arbitrating unit 5 is completed, then the short-term captured file generation unit 31 outputs a restart instruction signal to the ring buffer unit 30, and the ring buffer unit 30 restarts the accumulation of packets. Therefore, since the accumulation of packets is restarted before the next instruction to start capturing arrives, it is possible to capture packets immediately after arrival when the next instruction to start capturing arrives from the outside.

Second Embodiment

Figure 7:
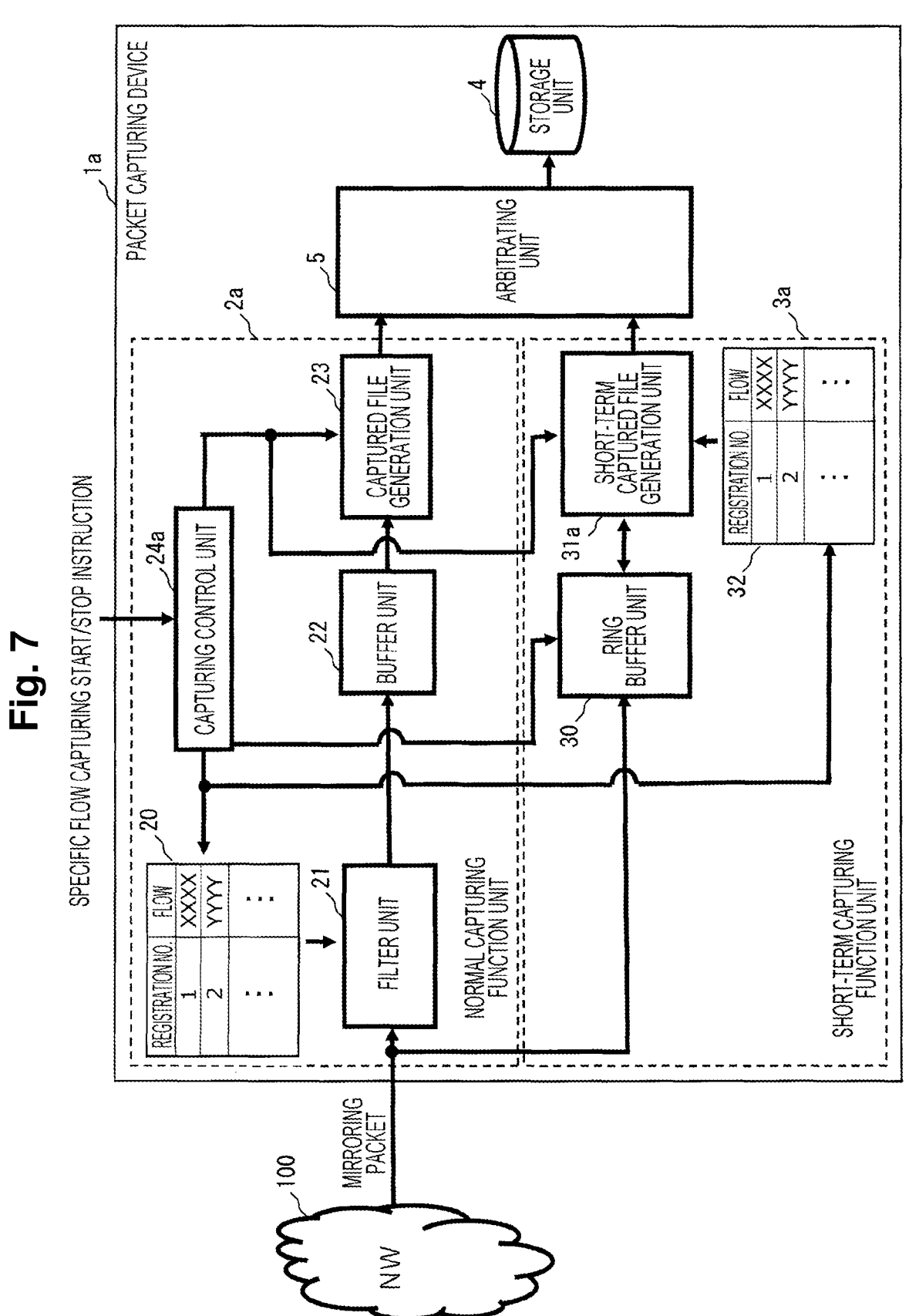
FIG. 7 is a block diagram illustrating a configuration of a packet capturing device according to a second embodiment of the present invention.

Next, a second embodiment of the present invention will be described. FIG. 7 is a block diagram illustrating a configuration of a packet capturing device according to the second embodiment of the present invention. A packet capturing device 1a according to the present embodiment includes a normal capturing function unit 2a (first capturing function unit), a short-term capturing function unit 3a (second capturing function unit), an arbitrating unit 5, and a storage unit 4.

The normal capturing function unit 2a includes a flow table 20, a filter unit 21, a buffer unit 22, a captured file generation unit 23, and a capturing control unit 24a that registers conditions of a capturing target flow designated by an instruction to start capturing from outside in the flow table 20 and a flow table 32 of the short-term capturing function unit 3a.

The short-term capturing function unit 3a includes a ring buffer unit 30, a short-term captured file generation unit 31a that selectively converts only packets that match conditions of a capturing target flow into a captured file from among packets accumulated in the ring buffer unit 30, and the flow table 32.

The present embodiment is different from the first embodiment in that the short-term captured file generation unit 31a picks up only data of the capturing target flow from among the packets accumulated in the ring buffer unit 30 and converts it into a captured file.

Figure 8:
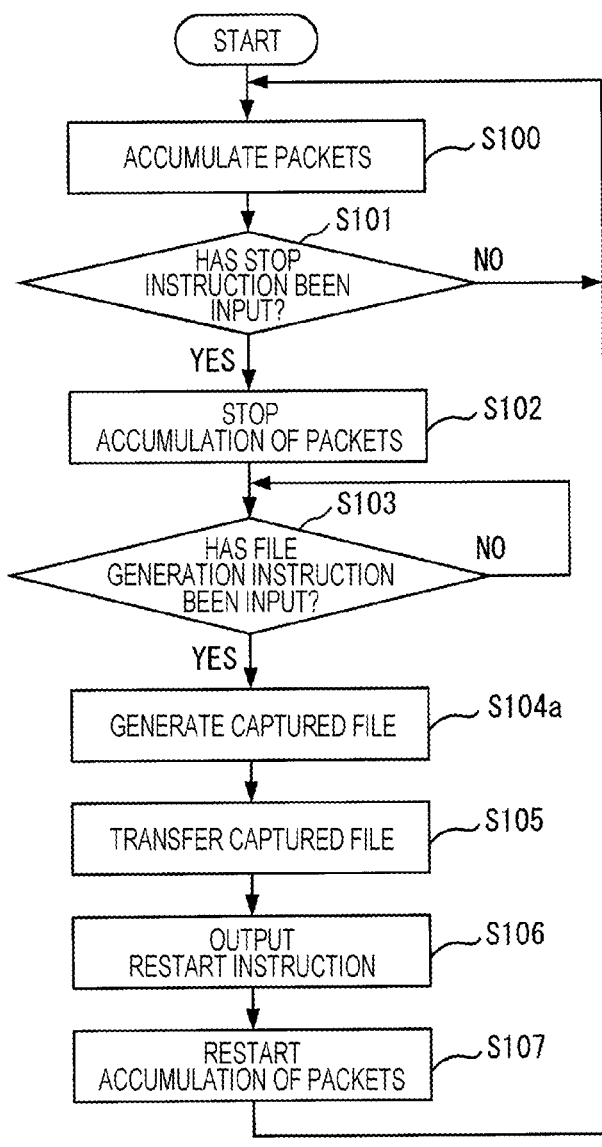
FIG. 8 is a flowchart for explaining operations of a short-term capturing function unit according to the second embodiment of the present invention.
Figure 9:
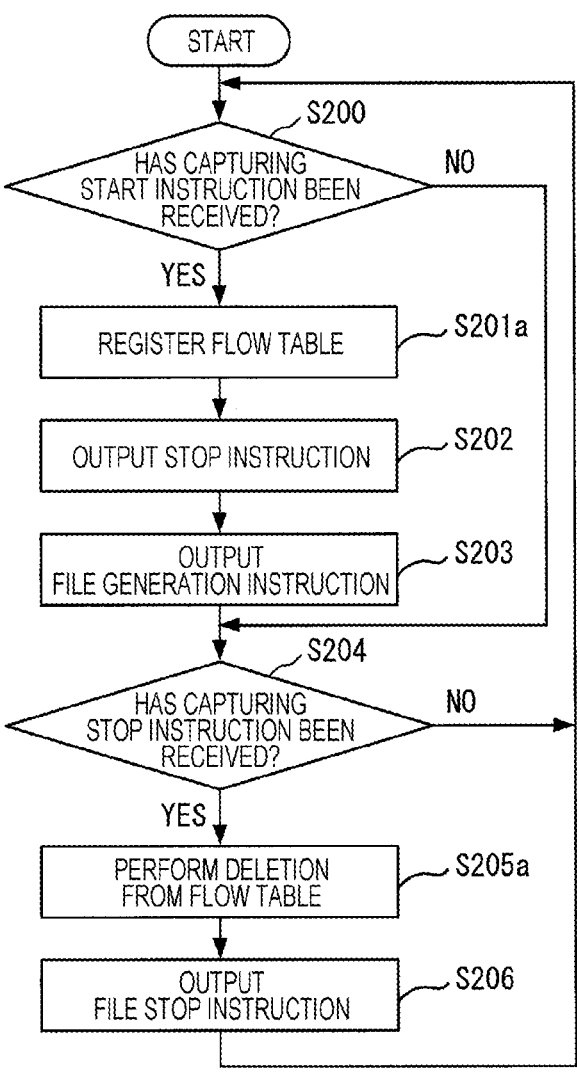
FIG. 9 is a flowchart for explaining operations of a capturing control unit of a normal capturing function unit according to the second embodiment of the present invention.

FIG. 8 is a flowchart for explaining operations of the short-term capturing function unit 3a, and FIG. 9 is a flowchart for explaining operations of the capturing control unit 24a of the normal capturing function unit 2a.

Operations (Steps S100 to S102 and S107 in FIG. 8) of the ring buffer unit 30 of the short-term capturing function unit 3a are the same as those in the first embodiment.

The capturing control unit 24a of the normal capturing function unit 2a registers conditions of the capturing target flow in the flow table 20 and the flow table 32 of the short-term capturing function unit 3a (Step S201a in FIG. 9) once an instruction to start capturing of a specific flow is received from the outside (YES in Step S200 in FIG. 9). In this manner, the same content as that in the flow table 20 is registered in the flow table 32. As described above in the first embodiment, the conditions of the capturing target flow are added to the instruction to start capturing received from the outside.

After the registration in the flow tables 20 and 32 is completed, the capturing control unit 24a outputs a stop instruction signal to the ring buffer unit 30 of the short-term capturing function unit 3a (Step S202 in FIG. 9) and outputs file generation instruction signals to the short-term captured file generation unit 31a of the short-term capturing function unit 3a and the captured file generation unit 23 of the normal capturing function unit 2a (Step S203 in FIG. 9).

The short-term captured file generation unit 31a of the short-term capturing function unit 3a extracts the packets accumulated in the ring buffer unit 30 and converts them into a captured file (Step S104a in FIG. 8) in response to an input of the file generation instruction signal from the capturing control unit 24a (YES in Step S103 in FIG. 8).

At this time, the short-term captured file generation unit 31a performs matching between the packets extracted from the ring buffer unit 30 and the conditions of the capturing target flow registered in the flow table 32 and selectively converts only packets that match the conditions into a captured file.

The short-term captured file generation unit 31a transfers the generated captured file to the arbitrating unit 5 (Step S105 in FIG. 8), and after the transfer is completed, the short-term captured file generation unit 31a outputs a packet accumulation restart instruction signal to the ring buffer unit 30 (Step S106 in FIG. 8).

Once an instruction to stop capturing of a specific flow is received from the outside (YES in Step S204 in FIG. 9), then the capturing control unit 24a of the normal capturing function unit 2a deletes the conditions of the capturing target flow, for which capturing stop has been designated, from the flow table 20 and the flow table 32 (Step S205a in FIG. 9).

After the deletion from the flow tables 20 and 32 is completed, the capturing control unit 24a outputs a file stop instruction signal to the captured file generation unit 23 of the normal capturing function unit 2a (Step S206 in FIG. 9).

Operations of the filter unit 21, the buffer unit 22, and the captured file generation unit 23 of the normal capturing function unit 2a (FIG. 4) and operations of the storage unit 4 and the arbitrating unit 5 (FIG. 5) are the same as those in the first embodiment.

As described above in the first embodiment, the ring buffer unit 30 of the short-term capturing function unit 3 accumulates packets of the entire flow including packets other than the capturing target flow. Therefore, the short-term capturing function unit 3 according to the first embodiment converts the packets of the entire flow into a captured file.

On the other hand, the short-term captured file generation unit 31a according to the present embodiment performs matching between the packets extracted from the ring buffer unit 30 and the conditions of the capturing target flow registered in the flow table 32 and selectively converts only packets that match the conditions into a captured file. According to the present embodiment, it is possible to prevent packets of the flow that is not the capturing target from being converted into a captured file, through such selective file conversion. As a result, it is possible not only to facilitate failure analysis using the captured file but also to reduce the capacity of the storage unit 4 in the present embodiment.

Third Embodiment

Figure 10:
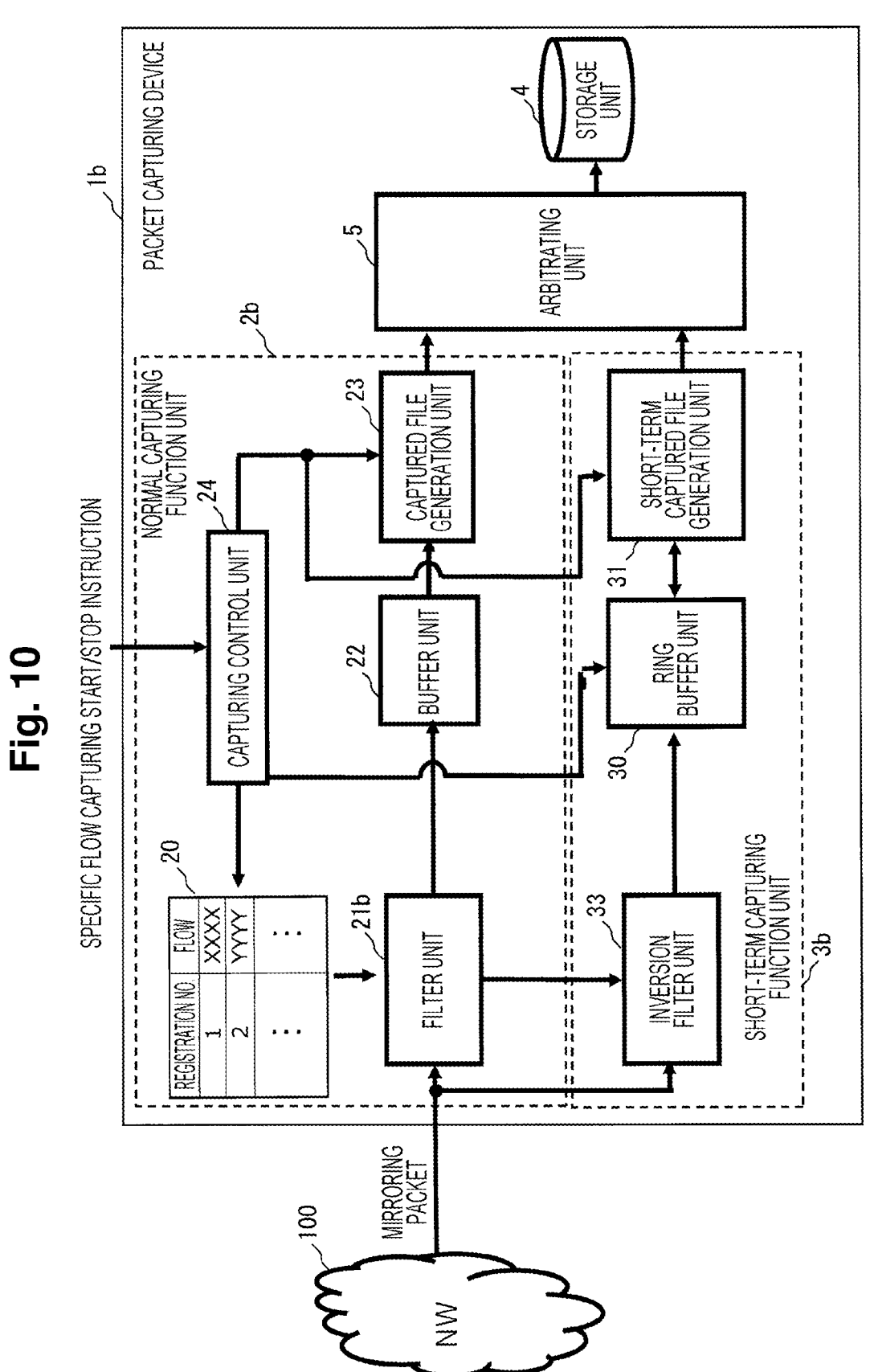
FIG. 10 is a block diagram illustrating a configuration of a packet capturing device according to a third embodiment of the present invention.

Next, a third embodiment of the present invention will be described. FIG. 10 is a block diagram illustrating a configuration of a packet capturing device according to the third embodiment of the present invention. A packet capturing device 1b according to the present embodiment includes a normal capturing function unit 2b (first capturing function unit), a short-term capturing function unit 3b (second capturing function unit), an arbitrating unit 5, and a storage unit 4.

The normal capturing function unit 2b includes a flow table 20, a filter unit 21b that performs matching between conditions registered in a flow table 20 and packets every time packets are received from a network 100 and outputs a matching result to the short-term capturing function unit 3b, a buffer unit 22, a captured file generation unit 23, and a capturing control unit 24.

The short-term capturing function unit 3b includes a ring buffer unit 30, a short-term captured file generation unit 31, and an inversion filter unit 33 (second filter unit) that allows only packets, from which a matching result that the packets do not match conditions registered in the flow table 20 has been obtained, to pass therethrough from among packets received from a network 100.

The present embodiment is different from the first embodiment in that the filter unit 21b of the normal capturing function unit 2b outputs the matching result between conditions of a capturing target flow registered in the flow table 20 and mirroring packets and the short-term capturing function unit 3b newly includes the inversion filter unit 33.

Figure 11:
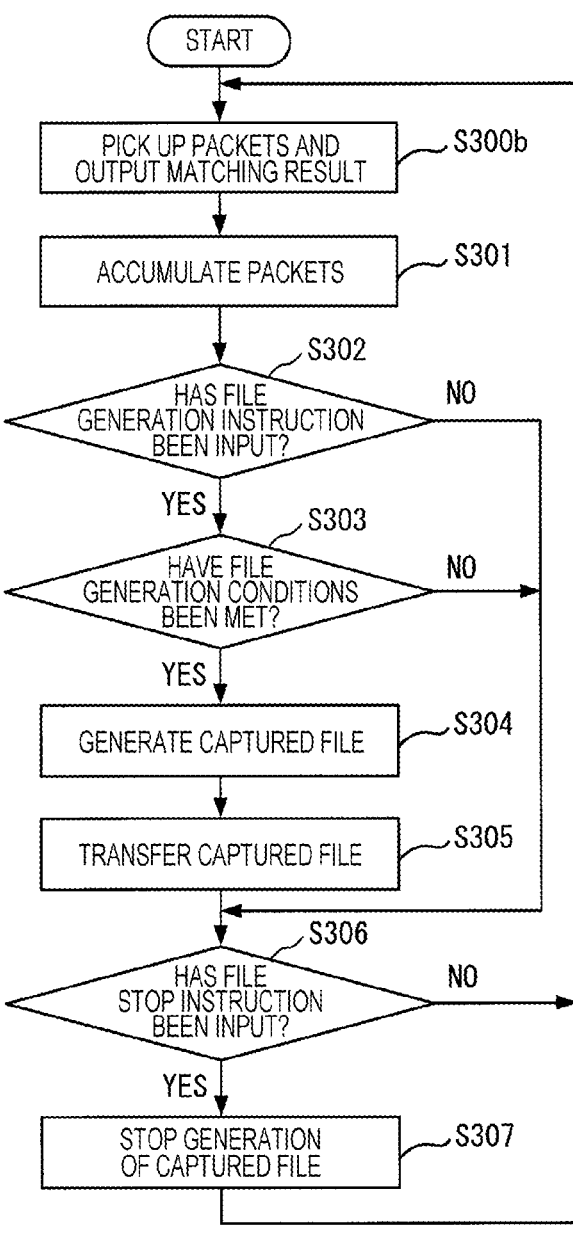
FIG. 11 is a flowchart for explaining operations of a filter unit, a buffer unit, and a captured file generation unit of a normal capturing function unit according to the third embodiment of the present invention.
Figure 12:
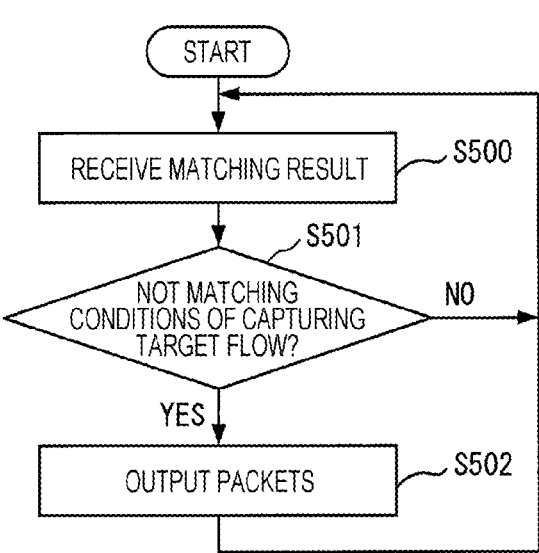
FIG. 12 is a flowchart for explaining operations of an inversion filter unit of a short-term capturing function unit according to the third embodiment of the present invention.

FIG. 11 is a flowchart for explaining operations of the filter unit 21b, the buffer unit 22, and the captured file generation unit 23 of the normal capturing function unit 2*b*, and FIG. 12 is a flowchart for explaining operations of the inversion filter unit 33 of the short-term capturing function unit 3*b*.

The filter unit 21*b* of the normal capturing function unit 2*b* performs matching between conditions of a capturing target flow registered in the flow table 20 and packets every time a mirroring packet is received from the network 100, and allows packets that match the conditions to pass therethrough, or discards packets that do not match the conditions. At the same time, the filter unit 21*b* outputs the matching result (matching/not matching) to the short-term capturing function unit 3*b* (Step S300*b* in FIG. 11).

The inversion filter unit 33 of the short-term capturing function unit 3*b* receives the matching result from the filter unit 21*b* (Step S500 in FIG. 12) every time the mirroring packet is received from the network 100 and outputs only packets from which the matching result that the packets do not match the conditions of the capturing target flow has been obtained to the ring buffer unit 30 in the later stage (Steps S501 and S502 in FIG. 12).

Operations of the ring buffer unit 30 and the short-term captured file generation unit 31 of the short-term capturing function unit 3*b* (FIG. 2), operations of the buffer unit 22 and the captured file generation unit 23 of the normal capturing function unit 2*b* (Steps S301 to S307 in FIG. 11), operations of the capturing control unit 24 of the normal capturing function unit 2*b* (FIG. 3), and operations of the storage unit 4 and the arbitrating unit 5 (FIG. 5) are the same as those in the first embodiment.

As described above in the first embodiment, a time lag of the normal capturing function unit 2*b* is a time needed by the conditions of the capturing target flow to be registered in the flow table 20 after an instruction to start capturing arrives. Once the conditions of the capturing target flow are registered in the flow table 20, a stop instruction signal is output from the capturing control unit 24 to the ring buffer unit 30, and file generation instruction signals are output to the short-term captured file generation unit 31 and the captured file generation unit 23.

Until the conditions of the capturing target flow are registered in the flow table 20, a matching result that packets of the capturing target flow do not match the conditions is output from the filter unit 21*b*. Therefore, the inversion filter unit 33 outputs the packets of the capturing target flow to the ring buffer unit 30 in the later stage. The filter unit 21*b* does not output the packets of the capturing target flow to the buffer unit 22 in the later stage.

Once the time lag of the normal capturing function unit 2*b* elapses, and the conditions of the capturing target flow are registered in the flow table 20, then a matching result that the packets of the capturing target flow match the conditions is output from the filter unit 21*b*. Therefore, the inversion filter unit 33 discards the packets of the capturing target flow and stops outputting them to the ring buffer unit 30 in the later stage. On the other hand, the filter unit 21*b* outputs the packets of the capturing target flow to the buffer unit 22.

In other words, the packets of the capturing target flow are accumulated only in the short-term capturing function unit 3*b* until the time lag of the normal capturing function unit 2*b* elapses, the packets are accumulated only in the normal capturing function unit 2*b* after the time lag elapses, and it is possible to prevent the short-term capturing function unit 3*b* and the normal capturing function unit 2*b* from accumulating the packets of the target flow in an overlapping manner.

The present embodiment prevents not only overlapping of the capturing periods of the normal capturing function unit 2*b* and the short-term capturing function unit 3*b* on the same flow but also outputting of data that has already been captured by the normal capturing function unit 2*b* from the short-term capturing function unit 3. Therefore, it is possible to efficiently hold packets by the ring buffer unit 30 but also to reduce capacity of the storage unit 4.

Figure 13:
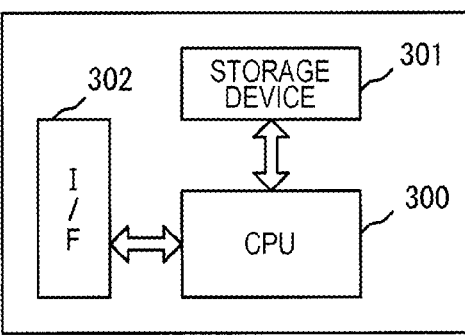
FIG. 13 is a block diagram illustrating a configuration example of a computer that realizes the packet capturing devices according to the first to third embodiments of the present invention.

The packet capturing devices 1, 1*a*, and 1*b* described in the first to third embodiments can be realized by a computer including a central processing unit (CPU), a storage device, and an interface and a program that controls these hardware resources. A configuration example of this computer is illustrated in FIG. 13.

The computer includes a CPU 300, a storage device 301, and an interface device (I/F) 302. A packet receiving circuit, a captured data output destination device, and the like are connected to the I/F 302. The program for causing such a computer to realize the packet capturing method according to embodiments of the present invention is stored in the storage device 301. The CPU 300 executes the processing described in the first to third embodiments according to the program stored in the storage device 301.

Also, a part of the packet capturing devices 1, 1*a*, and 1*b* described above in the first to third embodiments may be configured of a hardware logic such as an application specific integrated circuit (ASIC) or a field-programmable gate array (FPGA).

INDUSTRIAL APPLICABILITY

Embodiments of the present invention can be applied to a technology of analyzing a cause of a communication failure in a network, for example.

REFERENCE SIGNS LIST

1, 1*a*, 1*b* Packet capturing device
2, 2*a*, 2*b* Normal capturing function unit
3, 3*a*, 3*b* Short-term capturing function unit
4 Storage unit
5 Arbitrating unit
20,32 Flow table
21, 21*b* Filter unit
22 Buffer unit
23 Captured file generation unit
24, 24*a* Capturing control unit
30 Ring buffer unit
31,31*a* Short-term captured file generation unit
33 Inversion filter unit

The invention claimed is:

1. A packet capturing device comprising:
a memory storage comprising instructions; and
one or more processors in communication with the memory storage, wherein the one or more processors execute the instructions to:
receive an instruction to start capturing from outside the packet capturing device;
accumulate, from among packets flowing through a network that is a monitoring target, first packets that match conditions of a target flow registered in a first flow table in response to the instruction to start capturing, wherein the conditions of the target flow designated by the instruction to start capturing are registered in the first flow table, and wherein the instructions to accumulate the first packets include specific instructions to:

allow only the first packets that match the conditions registered in the first flow table to pass through a first filter from among the packets received from the network;

accumulate, by a first buffer, the first packets that have passed through the first filter; and convert the first packets accumulated in the first buffer into a first captured file;

accumulate second packets received from the network in a second buffer with a ring buffer structure during a period based on the conditions of the target flow to be registered in the first flow table after arrival of the instruction to start capturing; and convert the second packets into a second captured file;

wherein an instruction to stop accumulation of the second packets to the second buffer is performed when registration in the first flow table is completed, and wherein an instruction to restart accumulation of packets to the second buffer is performed when an output of the second captured file generated from the second packets accumulated in the second buffer is completed.

2. The packet capturing device according to claim 1, wherein the instructions to convert the second packets into the second captured file include specific instructions to selectively convert only the second packets that match the conditions of the target flow into the second captured file from among the second packets.

3. The packet capturing device according to claim 2 wherein the conditions of the target flow are stored in a second flow table, wherein the conditions of the target flow designated by the instruction to start capturing are registered in the second flow table, and wherein the instructions to accumulate the second packets and convert the second packets into the second captured file include specific instructions to:

accumulate the second packets received from the network in the second buffer with the ring buffer structure; and selectively convert only the second packets that match the conditions registered in the second flow table into the second captured file from among the second packets accumulated in the second buffer.

4. The packet capturing device according to claim 1, the instructions include further instructions to:

perform matching between the conditions registered in the first flow table and packets received from the network to obtain a matching result, wherein the instructions to accumulate the second packets comprises specific instructions to:

accumulate only the second packets from which the matching result indicates do not match the conditions registered in the first flow table from among the packets received from the network during the period.

5. The packet capturing device according to claim 4, wherein the conditions of the target flow are stored in the first flow table, wherein the conditions of the target flow designated by the instruction to start capturing are registered in the first flow table, and wherein the instructions to accumulate the first packets and convert the first packets into the first captured file include specific instructions to:

allow only the first packets that match the conditions registered in the first flow table to pass through the first filter from among the packets received from the network and output the matching result;

accumulate, by the first buffer, the first packets that have passed through the first filter; and convert the first packets accumulated in the first buffer into the first captured file.

6. The packet capturing device according to claim 5, wherein the conditions of the target flow are stored in a second flow table, wherein the conditions of the target flow designated by the instruction to start capturing is registered in the second flow table, and wherein the instructions to accumulate the second packets and convert the second packets into the second captured file include specific instructions to:

allow only the second packets from which the matching result indicating that the packets do not match the conditions registered in the first flow table has been obtained to pass through a second filter from among the packets received from the network;

accumulate the second packets that have passed through the second filter in the second buffer with the ring buffer structure; and convert the second packets accumulated in the second buffer into the second captured file.

7. The packet capturing device according to claim 1, wherein the one or more processors execute instructions to store the first captured file and the second captured file in the memory storage, and wherein the instructions include further instructions to:

perform control to place priority on writing of the first captured file when the first captured file is written in the memory storage.

8. A packet capturing method comprising:

a first step of registering conditions of a target flow designated by an instruction to start capturing in a flow table;

a second step of accumulating, in a first buffer, first packets that match the conditions of the target flow registered in the flow table from among packets flowing through a network that is a monitoring target, and allowing only the first packets that match the conditions registered in the flow table to pass through a first filter from among the packets received from the network;

a third step of converting the first packets accumulated in the first buffer into a first captured file;

a fourth step of accumulating, in a second buffer with a ring buffer structure, second packets received from the network during a period based on the conditions of the target flow to be registered in the flow table after arrival of the instruction to start capturing;

a fifth step of converting the second packets accumulated in the second buffer into a second captured file;

a sixth step of stopping accumulation of the second packets to the second buffer when registration in the flow table is completed; and a seventh step of restarting accumulation of packets to the second buffer when an output of the second captured file generated from the second packets accumulated in the second buffer is completed.

9. The packet capturing device according to claim 1, wherein the first buffer is a first-in first-out (FIFO) buffer.

10. The packet capturing device according to claim 1, wherein the one or more processors execute the instructions to convert the first packets accumulated in the first buffer into the first captured file when an amount of packets accumulated in the first buffer reaches a predetermined amount or a predetermined time elapses.

11. The packet capturing device according to claim 1, wherein the packets flowing through the network are mirroring packets generated by a mirroring function of a device on the network.

12. The packet capturing method according to claim 8, wherein the fifth step includes selectively converting only the second packets that match the conditions of the target flow registered in the flow table into the second captured file from among the second packets accumulated in the second buffer.

13. The packet capturing method according to claim 8, further comprising performing matching between the conditions registered in the flow table and packets received from the network to obtain a matching result every time a packet is received from the network, and wherein the fourth step comprises accumulating only second packets from which the matching result indicates the packets do not match the conditions registered in the flow table from among the packets received from the network during the period.

14. The packet capturing method according to claim 8, further comprising storing the first captured file and the second captured file in a storage unit, and placing priority on writing of the first captured file to the storage unit over the second captured file.

15. The packet capturing method according to claim 8, wherein the second buffer has a capacity capable of accumulating packets corresponding to a time that is longer than the period based on the conditions of the target flow to be registered in the flow table after arrival of the instruction to start capturing.

16. A non-transitory computer-readable medium storing a program that causes a computer to execute:

receiving an instruction to start capturing of a target flow from outside;

registering conditions of the target flow designated by the instruction to start capturing in a first flow table and a second flow table;

accumulating, in a ring buffer, packets received from a network that is a monitoring target;

stopping accumulation of packets in the ring buffer when registration in the first flow table and the second flow table is completed;

selectively converting only packets that match conditions registered in the second flow table into a second captured file from among packets accumulated in the ring buffer;

restarting accumulation of packets in the ring buffer when an output of the second captured file generated from the packets accumulated in the ring buffer is completed;

allowing only packets that match conditions registered in the first flow table to pass through a filter from among packets received from the network;

accumulating, by a buffer, the packets that have passed through the filter; and converting the packets accumulated in the buffer into a first captured file.

17. The non-transitory computer-readable medium according to claim 16, wherein the ring buffer overwrites an oldest accumulated packet with a latest packet when the ring buffer becomes full.

18. The non-transitory computer-readable medium according to claim 16, the program further causing the computer to execute storing the first captured file and the second captured file in a storage unit, and placing priority on writing of the first captured file to the storage unit over writing of the second captured file to the storage unit.

19. The non-transitory computer-readable medium according to claim 16, wherein the conditions of the target flow include a transmission source MAC address, a destination MAC address, and an IP address.

20. The non-transitory computer-readable medium according to claim 16, wherein the packets received from the network are mirroring packets generated by a mirroring function of a device on the network.

\* \* \* \* \*